United States Patent

[11] 3,536,047

[72] Inventor: Robert O. Barratt, Parsippany, New Jersey
[21] Appl. No.: 743,679
[22] Filed: July 10, 1968
[45] Patented: Oct. 27, 1970
[73] Assignee: Foster Wheeler Corporation, Livingston, New Jersey, a corporation of New York

[54] SODIUM HEATED STEAM GENERATOR
6 Claims, 4 Drawing Figs.

[52] U.S. Cl. .................................................. 122/32, 165/169
[51] Int. Cl. .................................................. F22b 1/06
[50] Field of Search .................................... 122/32, 34; 165/158, 145, 163

[56] References Cited
UNITED STATES PATENTS

| | | | |
|---|---|---|---|
| 3,117,623 | 1/1964 | Guibsch | 165/163 |
| 3,126,949 | 3/1964 | Boni et al. | 122/32X |
| 3,338,301 | 8/1967 | Romanos | 122/32X |

Primary Examiner—Kenneth W. Sprague
Attorney—Constantine A. Michalos, John Maier III and Marvin A. Naigur ABSTRACT: A sodium heated recirculating steam generator utilizing a parallel multiple tube serpentine configuration and having a separate vertical flash tank. A fluid or water is circulated through the serpentine tubes which in turn extend into a body of the sodium liquid, contained within an elongated vertically extending hemispherically ended cylindrical tank from which heat is absorbed to convert the water into steam. The water conveying serpentine tubes are arranged within a vertically extending, open ended elongated, rectangular enclosure, which in turn is within the tank, for presenting about two or three serpentine tube coils to the hot sodium entering the top end of the rectangular enclosure so as to preheat the water. The parallel tubes are then shrouded and directed vertically downwardly at one side of the rectangular enclosure. The tubes are then unshrouded, at the lower end of the rectangular enclosure, in close proximity of the sodium tank outlet, and are directed upwardly counterflow to the downwardly flowing sodium in serpentine coil configuration until reaching the bottom of the two or three tube coils. The tubes are here again shrouded, directed vertically upwardly to a water and steam outlet and to a drum for separating the steam from the water to be then superheated and used, such as for driving a turbine for generating electricity.

INVENTOR.
ROBERT O. BARRATT

BY
Constantine A. Michalos
ATTORNEY

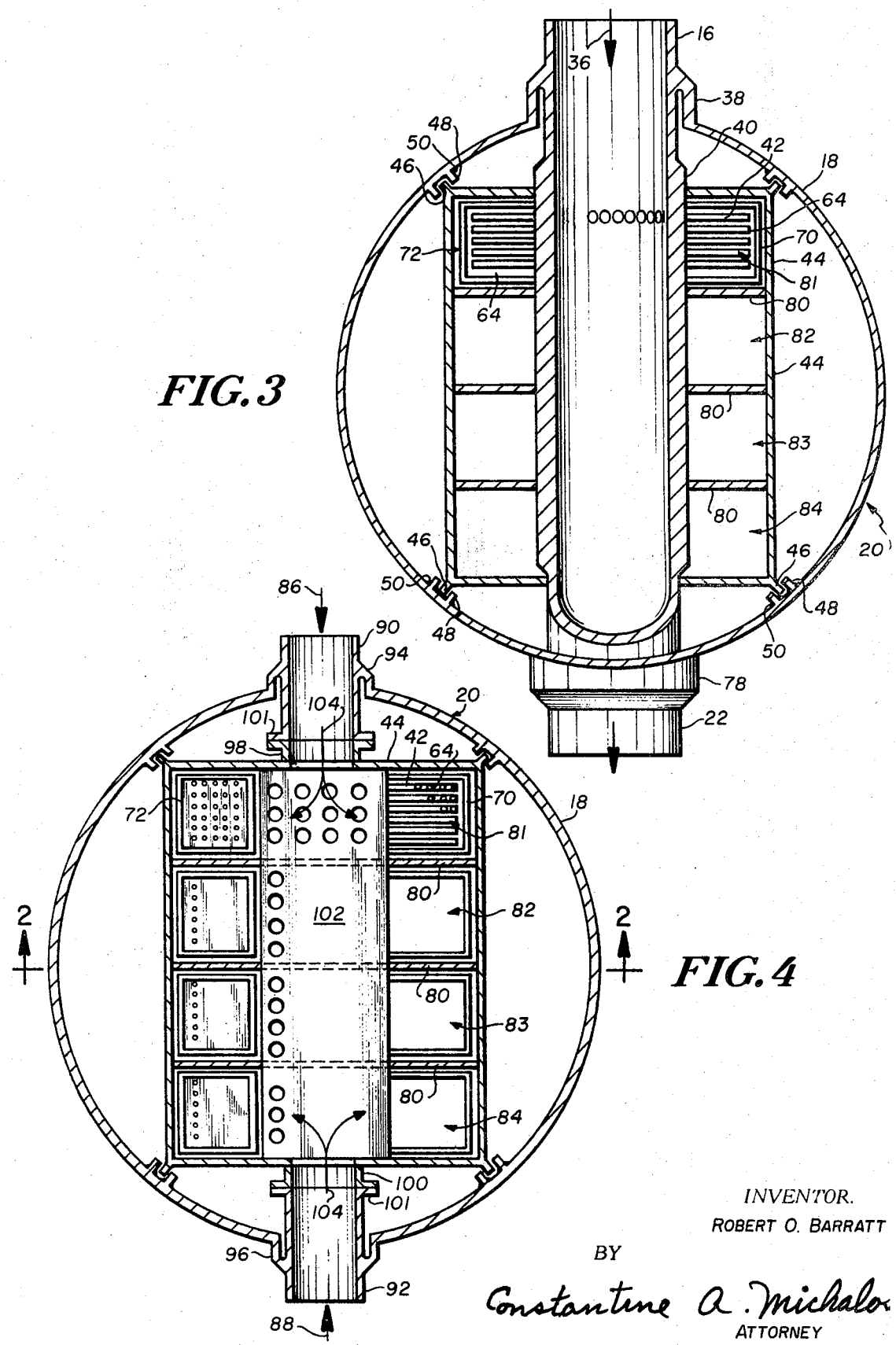

3,536,047

SODIUM HEATED STEAM GENERATOR

BACKGROUND OF THE INVENTION

This invention relates generally to heat exchangers, and particularly to a sodium heated recirculating steam generator utilizing a serpentine multiple tube arrangement.

Heretofore, different sodium heated steam generator tube arrangements have been considered, including the helical coil, bayonet tube, and U-tube. In addition, different sodium heated steam generator systems have been used, such as the once-through or recirculating scheme systems. These arrangements and systems use sodium liquid coolant of a nuclear reactor, as a heat carrier, for evaporating a fluid such as water in a vapor generator. The generator vapor is used, for example, in producing power in a turbine for generating electricity. That is, in recent years considerable effort has been directed toward the development of a closed-circuit thermal power plant for the long term generation of electrical power through nuclear heat. In a typical power plant of this type, economics dictate to use the smallest number of tubes; hence, with recirculating arrangement, it is essential to increase the percent steam by weight leaving the evaporating bank of tubes of the generator to a maximum commensurate with avoidance of departure from nucleate boiling (DNB).

SUMMARY OF THE INVENTION

The present invention raises the exit quality of a two-phase fluid to a maximum by placing a concurrentflow economizer or preheater ahead of a counterflow evaporator, thus reducing the maximum heat fluxes to a minimum, which the exiting two-phase fluid experiences.

This invention relates generally to heat exchanging systems and has particular reference to a sodium heated recirculating steam generator system utilizing a serpentine multiple tube arrangement for converting water into steam. More particularly, the steam generator described herein provides for an interchange of heat between liquid sodium heated by a nuclear reactor and water within the serpentine tubes to produce high temperature steam for operating a steam turbine to generate electricity while avoiding departure from nucleate boiling (DNB).

The steam generator herein disclosed comprises essentially of a container or tank structure through which liquid sodium is circulated and a series of serpentine heat exchange tube assemblies extending downwardly into a body of liquid sodium contained within an open ended elongated rectangular enclosure supported within the tank.

A principal object of this invention is to provide for a sodium heated steam generator operably avoiding departure from nucleate boiling (DNB) by locating an economizer above an evaporator and hence reducing the maximum heat flux that the evaporator experiences and in turn increasing the steam exit quality while still maintaining a downflow sodium circuit and therefore avoiding the sodium stagnation problems associated with upflow sodium systems.

Another object of this invention is to utilize a serpentine tube configuration, including hair pin bends, for a heat exchange tube assembly which lends itself to both once-through and recirculating design and in addition extrapolation to larger sizes.

Yet another object of this invention is to provide for a steam generator that has tube surfaces which possess inherent mechanical flexibility to allow freedom in the arrangement of the supports to minimize vibration without reducing the ability of the surfaces to absorb thermal growth effects.

Still another object of this invention is to provide an in-plane serpentine coil tube simplified arrangement so as to facilitate easy inspection of the tubes after assembly and to provide for a partial disassembly and repair of the tubes after a thermal excursion such as a sodium water reaction.

An additional object of this invention is to provide for a steam generator having a serpentine economizer and a serpentine evaporator which are identical in general arrangement and mechanical conception to thereby simplify its manufacture and assembly.

Another and further objects of this invention will be apparent from the following description and claims and may be understood by reference to the accompanying drawings, which by way of illustration, show a preferred embodiment of the invention and what we now consider to be the best mode of applying the principles thereof. Other embodiments of the invention may be used without departing from the scope of the present invention as set forth in the appendant claims.

BRIEF DESCRIPTION OF THE DRAWING

FIG. 3 is a cross-sectional view taken along line 3–3 of the structure shown in FIG. 2; and, FIG. 4 is a cross-sectional view taken along line 4–4 of the structure shown in FIG. 2.

DESCRIPTION OF THE PREFERRED EMBODIMENTS

Figures 1, 2:
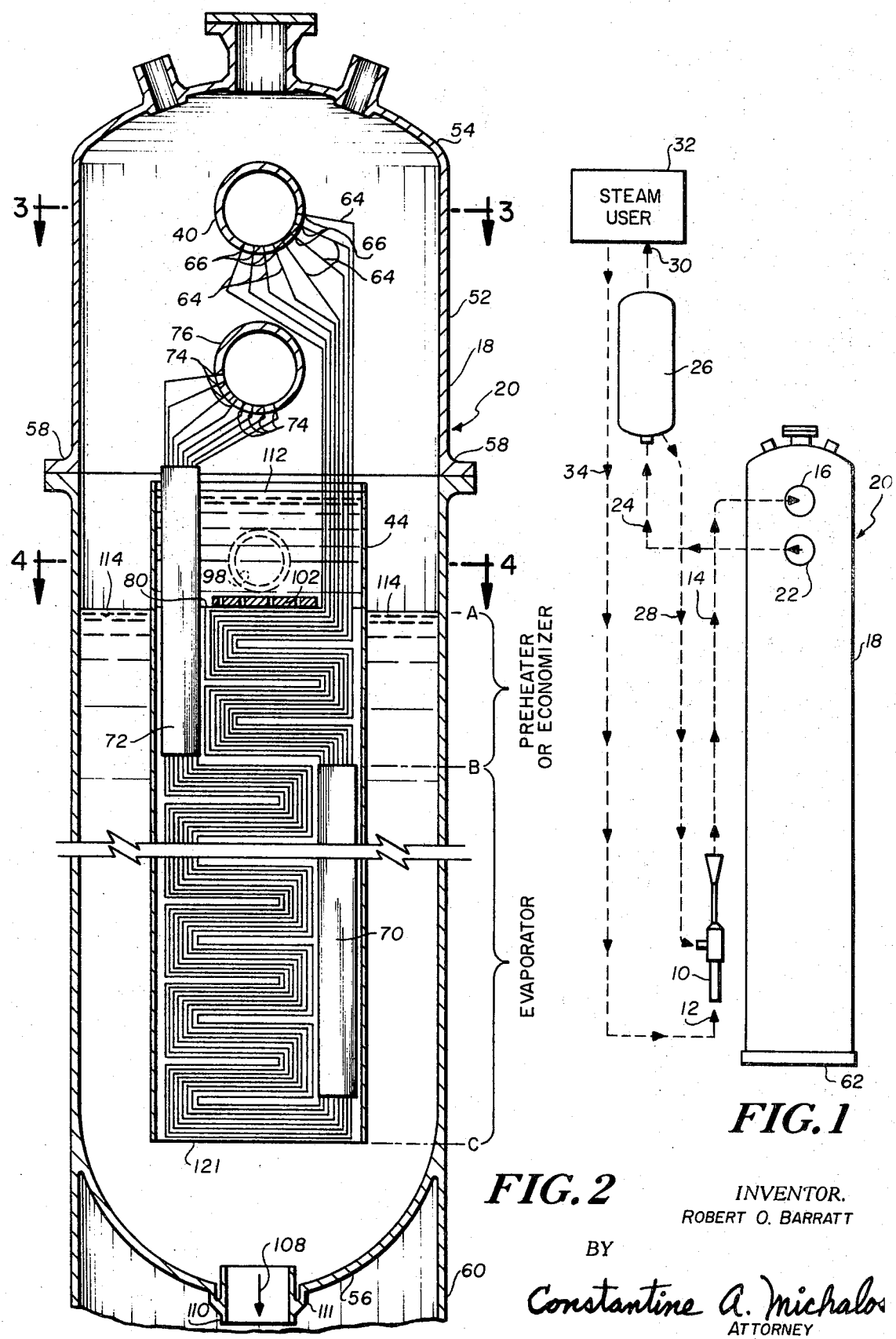
FIG. 1 is a diagrammatic illustration of the fluid circulatory circuit of the vapor generating system with certain auxiliary equipment.
FIG. 2 is a vertical sectional view through a steam generator embodying the present invention taken substantially along line 2–2 of FIG. 4.

Referring to the drawing and more particularly to FIG. 1, working fluid, such as water, is delivered to a recirculating pump 10 of either a jet or of a centrifugal variety, as shown by arrow 12, which pumps the working fluid such as water at a predetermined pressure, in a direction shown by arrows 14, to a water inlet pipe 16 mounted inside a pressure vessel or tank 18 of a steam generator 20 via a thermal sleeve, as hereinafter more fully explained and emerges as a two-phase fluid mixture such as steam and water through an outlet pipe 22 mounted on the tank 18 via a thermal sleeve, as hereinafter more fully explained, located on the tank 18 beneath the inlet pipe 16.

The steam and water two-phase fluid mixture is then directed, as shown by arrows 24, to a drum and liquid separator 26, such as described in U.S. Pat. No. 3,314,220, issued on Apr. 18, 1967, to Goldstein and assigned to Foster Wheeler Corporation, which may include centrifugal separators and dryers of the Chevron-type.

The water separated from the two-phase fluid is then directed, as shown by arrows 28, back to the pump 10 for recirculation in the system. The steam, meanwhile, is directed, as shown by arrows 30, to be superheated and used in a steam user system 32, such as a turbine system. The steam may be then condensed in the system 32, and directed, as shown by arrows 34, back to the pump 10, as shown by the arrow 12 to be then directed to and from the steam generator 20.

The steam generator 20, as best shown in FIGS. 2, 3, and 4, utilizes the recirculating principle including a separation drum 26 hereinbefore-described. The water is forced by the pump 10, as shown by arrow 36, through the inlet pipe 16, via thermal sleeve 38, to a single inlet end fed header 40, to be distributed in a plurality of parallel multiple tube banks 42 of a serpentine configuration.

The working fluid conveying serpentine tubes 42 are arranged within a vertically extending, open ended elongated, rectangular sodium flow enclosure 44, which in turn is laterally supported by four integral vertically extending skids 46, slidable in channeled tracks 48 within the pressure vessel or tank 18. The tracks 48 are rigidly secured to the tank 18 by attaching means such as welds 50. The rectangular enclosure 44 being free to slide along the tracks 48 to permit extension of the enclosure 44 within the tank 18 as to accommodate any differential growth effects. In addition, by virtue of skids 46 being movable within the tracks 48, the rectangular enclosure 44 can be removed from the tank 18 when desired.

The tank 18 of the steam generator 20 is formed of an upright cylindrical portion 52 with domed or hemispherical ends 54 and 56. The end 54 being removable at flange 58 for complete withdrawal of the enclosure 44 or for removal of the banks 42. The end 56 includes a skirt 60 having a base 62, as best shown in FIGS. 1 and 2, for supporting the steam generator 20 in an upright position.

As best shown in FIG. 2, each bank 42 is comprised of a plurality of in-plane fluid conveying tubes 64. Each tube is radially connected at one end 66, in fluidic interconnection with the inlet end fed header 40 for receiving the water from the pump 10. The tubes 64 are bunched, still in the same plane and directed vertically downwardly, within the upper end of the enclosure 44. The fluid conveying tubes 64 are then formed in a serpentine configuration for about two or three tube coils within the upper portion of the rectangular enclosure 44 and then directed vertically in a bunched formation within insulating shrouds 70 down to the lower end of the rectangular enclosure 44.

The tubes are again coiled in a serpentine configuration and directed upwardly to meet the lower coil of the two or three upper serpentine coils. At this location, the tubes are then shrouded again and directed in a bunched formation vertically within insulating shrouds 72 to be radially connected at their other ends 74 to an outlet header 76 for collecting the fluid therein and presenting it to the drum 26, as best shown by the arrows 24, through the water and steam outlet pipe 22 via thermal sleeve 78.

FIGS. 3 and 4 show that the rectangular enclosure 44 is divided by plates 80 into four separate rectangular sodium passages 81, 82, 83, and 84. Within the rectangular sodium passages extend the tubes 64 in serpentine, parallel in-plane relationship to each other. In addition, within the passages 81, 82, 83, and 84, extend the individual shrouds 70 and 72, as best shown in FIGS. 3 and 4.

The hot reactor sodium enters the steam generator 20, as shown by arrows 86 and 88, through inlet pipes 90 and 92 via thermal sleeves 94 and 96, which are diametrically opposed and supported by the tank 18 of the steam generator 20. The sodium then enters the enclosure 44 by conduits 98 and 100 which in turn are connected to pipes 90 and 92 by a flange 101 which in turn supports the enclosure 44.

The hot sodium is then distributed by a baffle 102 over the top of each individual passage 81, 82, 83, and 84 of the enclosure 44, as shown by arrows 104. The sodium will be equally distributed among the passages 81, 82, 83, and 84 since no restriction is offered to the sodium while flowing in cross flow across the top of the baffle 102.

From the area of the baffle 102 the hot sodium flows downward over the serpentine tubes contained within each rectangular enclosure passage 81, 82, 83, and 84 to the bottom of the enclosure 44 and of the tank 18 and outwardly, as shown by arrow 108, through sodium outlet pipe 110 via thermal sleeve 111, to the reactor, not shown.

The enclosure 44 is supported against the effects of the hydrostatic pressure by the equalizing effects of the stagnant sodium accummulated on the external portion of the enclosure 44 which bears against the outside of the enclosure. Under equilibrium conditions, the enclosure will only have to support the outward force due to friction pressure drop. As shown in FIG. 2, this is the difference between a normal sodium operating level 112 which is above the sodium inlet pipes 90 and 92 and which is also situated near the top of the enclosure 44, and a stagnant sodium level 114.

As the sodium flows down over the tube banks, it cools, this temperature profile is reflected in the stagnant sodium outside the enclosure 44, thus minimizing the effects of thermal stress. As brought out before, the enclosure 44 is mounted on the tracks 48, which accommodate any differential growth effects.

In addition, it should be noted that the division of the enclosure 44 into four separate passages 81, 82, 83, and 84 would prevent total damage to the tubes 64 by containing within one passage, any thermal excursion, such as a sodium and water reaction.

As shown in FIG. 2, the initial two or three serpentine coils, extending from level A to B, comprises a preheater or economizer of the steam generator while the evaporator is comprised of the serpentine tube coils extending from level B to level C.

In the operation of the steam generator 20, the steam generator tank 18 is initially filled with liquid sodium through the outlet pipe 110, the rising sodium level finally reaching a level intermediate between levels 112 and 114.

The reactor hot sodium is passed to and from the steam generator 20 from and to the reactor, not shown, through the inlet pipes 90 and 92, and outlet pipe 110, respectively. The sodium being distributed by the baffle 102 and directed substantially equally in all the enclosure passages 81, 82, 83, and 84, and through the preheater to initially heat the relatively cool water, and downwardly in a counterflow direction to the upcoming water and steam fluid within the serpentine coiled tubes of the evaporator. The sodium is then directed out of the tank 18 as shown by arrow 108, through the sodium outlet pipe 110.

Meanwhile, the feed water, delivered from the recirculating pump 10, feeds the tubes 64 via the end fed inlet header 40. The cool water then passes downward into the flow enclosure 44, where the tubing is formed into the two or three serpentine coiled preheater or economizer. On leaving the economizer, the feed water passes down the shrouded downcomer section through shrouds 70 leading to the counterflow evaporator which starts with coil 121, as shown in FIG. 2. Two-phase fluid is then produced within the evaporator and flows up through the shroud 72 from which it leaves the steam generator unit by passing out the outlet pipe 22 situated beneath the inlet pipe 16. The two-phase fluid is finally passed to the drum 26 where it undergoes centrifugral separation and drying before passing to the superheater within the steam user 32.

The serpentine coil configuration of this system represents a flexible unit which lends itself to both once-through and recirculation arrangement, and to extrapolation to larger sizes. The flexibility of the serpentine arrangement is utilized in the concept of raising the economizer above the evaporator and hence reducing the maximum heat flux that the evaporator experiences from the initial heat reaction of the hot sodium. This arrangement will increase the two-phase fluid exit quality without encountering departure from nucleate boiling (DNB) while still maintaining a downflow sodium circuit and thereby avoiding the sodium stagnation problems associated with upflow sodium systems. It will therefore be appreciated that the preheater or economizer placed above the evaporator within the steam generator vessel, in combination with the serpentine coil arrangement of the evaporator, presenting a counterflow to the downflow sodium, would produce a system most amiable to the high temperature and heat transfer coefficients typical of advanced reactors of the sodium cooled type and thereby produce a more workable recirculatory heat exchanger while avoiding departure from nucleate boiling, and still maintaining high exit qualities.

While the present invention has been described in connection with a heat exchanging system such as a steam generator employing liquid sodium and water as the two heat exchange mediums, it will be apparent that this invention will be useful in other applications and in other heat exchangers in which heat is exchanged between two different liquids than those described herein.

I claim:

1. A sodium heated steam generator comprising a vessel for receiving hot sodium at its upper level and directing it downwardly through the vessel and outwardly through its lower level, fluid conveying tubes in serpentine configuration for receiving relatively cooled working fluid at the upper level of said vessel, said serpentine tubes including a number of coils extending downwardly into the sodium liquid contained within the said vessel at the upper level of said vessel, and directed to the lower level of said vessel wherein it is again coiled in a serpentine configuration and continued upwardly within said vessel until reaching the bottom portion of said initial serpentine coils at the upper level of said vessel, the working fluid being directed within said serpentine tubes for producing a two-phase working fluid of liquid and vapor, said initial serpentine coils at the upper level of said vessel being used as a preheater and said lower serpentine coils extending from the lower level to the upper level of said vessel, at the bottom of said preheater being the evaporator for producing the two-phase fluid, and including an enclosure extending substantially the length of said vessel enclosing said preheater and said evaporator for directing the sodium liquid downwardly in close proximity of the fluid conveying serpentine tubes, said fluid conveying tubes being in parallel multiple banks and having shroud means for directing the tubes from the lower serpentine coil of said preheater downwardly to the lower serpentine coil of said evaporator and shroud means for receiving the tubes from the upper serpentine coil of said evaporator and directing them past the preheater to the outlet of said vessel thereby improving fluidic passage of both fluids and substantially minimizing the probability of departure from nucleate boiling.

2. A sodium heated steam generator comprising a vessel for receiving hot sodium at its upper level and directing it downwardly through the vessel and outwardly through its lower level, fluid conveying tubes in serpentine configuration for receiving relatively cooled working fluid at the upper level of said vessel, said serpentine tubes including a number of coils extending downwardly into the sodium liquid contained within the said vessel at the upper level of said vessel, and directed to the lower level of said vessel wherein it is again coiled in a serpentine configuration and continued upwardly within said vessel until reaching the bottom portion of said initial serpentine coils at the upper level of said vessel, the working fluid being directed within said serpentine tubes for producing a two-phase working fluid of liquid and vapor, said initial serpentine coils at the upper level of said vessel being used as a preheater and said lower serpentine coils extending from the lower level to the upper level of said vessel, at the bottom of said preheater being the evaporator for producing the two-phase fluid, and including an enclosure extending substantially the length of said vessel enclosing said preheater and said evaporator for directing the sodium liquid downwardly in close proximity of the fluid conveying serpentine tubes, said serpentine tubes being grouped in banks of in-plane coil tube simplified arrangement for allowing assembly of a plurality of said tubes thereby forming substantially a rectangular cross-sectional configuration, and said enclosure passages being of rectangular cross-sectional configuration for receiving the plurality of said tubes and thereby facilitating easy inspection of the tubes after assembly and for providing a partial disassembly and repair of said tubes after a thermal excursion such as a sodium and water reaction.

3. A sodium heated steam generator comprising a vessel for receiving hot sodium at its upper level and directing it downwardly through the vessel and outwardly through its lower level, fluid conveying tubes in serpentine configuration for receiving relatively cooled working fluid at the upper level of said vessel, said serpentine tubes including a number of coils extending downwardly into the sodium liquid contained within the said vessel at the upper level of said vessel, and directed to the lower level of said vessel wherein it is again coiled in a serpentine configuration and continued upwardly within said vessel until reaching the bottom portion of said initial serpentine coils at the upper level of said vessel, the working fluid being directed within said serpentine tubes for producing a two-phase working fluid of liquid and vapor, said tubes being presented in banks of in-plane coil tubes forming substantially rectangular cross-sectional configuration, said enclosure being of rectangular cross-sectional configuration for receiving said tubes, and further comprising a plurality of opposed elongated tracks supported vertically within said vessel, said enclosure including vertically extending skids, each skid supported within a track of said vessel, whereby said enclosure is free to slide along said tracks for extension of said enclosure within said vessel to accommodate any thermal differential growth effects and to permit quick removal of said enclosure from said vessel.

4. A sodium heated steam generator comprising a vessel for receiving hot sodium at its upper level and directing it downwardly through the vessel and outwardly through its lower level, fluid conveying tubes in serpentine configuration for receiving relatively cooled working fluid at the upper level of said vessel, said serpentine tubes including a number of coils extending downwardly into the sodium liquid contained within the said vessel at the upper level of said vessel, and directed to the lower level of said vessel wherein it is again coiled in a serpentine configuration and continued upwardly within said vessel until reaching the bottom portion of said initial serpentine coils at the upper level of said vessel, the working fluid being directed within said serpentine tubes for producing a two-phase working fluid of liquid and vapor, said initial serpentine coils at the upper level of said vessel being used as a preheater and said lower serpentine coils extending from the lower level to the upper level of said vessel, at the bottom of said preheater being the evaporator for producing the two-phase fluid, and including an enclosure extending substantially the length of said vessel enclosing said preheater and said evaporator for directing the sodium liquid downwardly in close proximity of the fluid conveying serpentine tubes, said enclosure being divided into a plurality of passages for receiving said serpentine tube coils of the preheater and the evaporator and protecting the remainder of said serpentine tube coils in the event of a thermal excursion, such as a sodium and water reaction within one of said passages, an inlet end feed header for receiving said working fluid at the upper level of said vessel and distributing it to said tubes first within said preheater and then within said evaporator and an outlet header, located below said inlet header, for collecting two-phase fluid produced within the evaporator and drum means for receiving said two-phase fluid and separating the same into liquid and vapor.

5. A sodium heated steam generator comprising a vessel for receiving hot sodium at its upper level and directing it downwardly through the vessel and outwardly through its lower level, fluid conveying tubes in serpentine configuration for receiving relatively cooled working fluid at the upper level of said vessel, said serpentine tubes including a number of coils extending downwardly into the sodium liquid contained within the said vessel at the upper level of said vessel, and directed to the lower level of said vessel wherein it is again coiled in a serpentine configuration and continued upwardly within said vessel until reaching the bottom portion of said initial serpentine coils at the upper level of said vessel, the working fluid being directed within said serpentine tubes for producing a two-phase working fluid of liquid and vapor, said initial serpentine coils at the upper level of said vessel being used as a preheater and said lower serpentine coils extending from the lower level to the upper level of said vessel, at the bottom of said preheater being the evaporator for producing the two-phase fluid, and including an enclosure extending substantially the length of said vessel enclosing said preheater and said evaporator for directing the sodium liquid downwardly in close proximity of the fluid conveying serpentine tubes, said enclosure being divided into a plurality of passages for receiving said serpentine tube coils of the preheater and the evaporator and protecting the remainder of said serpentine tube coils in the event of a thermal excursion, such as a sodium and water reaction within one of said passages, sodium inlet means including a sodium inlet pipe connecting said rectangular enclosure just above the inlets to said sodium passages, a thermal sleeve interposed between said sodium inlet pipe and said vessel for protecting said vessel against stresses due to heat differential, and a flat baffle arranged horizontally at the top of said passages for receiving the relatively hot sodium on the top thereof, said baffle having apertures for evenly directing the sodium over the top and within each of said passages past each bank of serpentine tubes.

6. A sodium heated steam generator comprising a vessel for receiving hot sodium at its upper level and directing it downwardly through the vessel and outwardly through its lower level, fluid conveying tubes in serpentine configuration for receiving relatively cooled working fluid at the upper level of said vessel, said serpentine tubes including a number of coils extending downwardly into the sodium liquid contained within the said vessel at the upper level of said vessel, and directed to the lower level of said vessel wherein it is again coiled in a serpentine configuration and continued upwardly within said vessel until reaching the bottom portion of said initial serpentine coils at the upper level of said vessel, the working fluid being directed within said serpentine tubes for producing a two-phase working fluid of liquid and vapor, said initial serpentine coils at the upper level of said vessel being used as a preheater and said lower serpentine coils extending from the lower level to the upper level of said vessel, at the bottom of said preheater being the evaporator for producing the two-phase fluid, and including an enclosure extending substantially the length of said vessel enclosing said preheater and said evaporator for directing the sodium liquid downwardly in close proximity of the fluid conveying serpentine tubes, said enclosure being divided into plurality of passages for receiving said serpentine tube coils of the preheater and the evaporator and protecting the remainder of said serpentine tube coils in the event of a thermal excursion, such as a sodium and water reaction within one of said passages, fluid inlet means including a fluid inlet pipe, a cylindrical inlet end feed heater attached to said inlet fluid pipe for distributing fluid to said tubes and a thermal sleeve interposed between said inlet pipe and said vessel at the upper level of said vessel for protecting the vessel against stresses due to differential heat, said tubes arranged in a plurality of banks, each bank radially extending in an in-plane arrangement around the circumference of said cylindrical inlet header, for forming said preheater and said evaporator and said preheater serpentine coils and said evaporator serpentine coils being in the same plane of the attaching ends of said tubes, said tubes further having outlet means identical to said inlet means located at the upper level of said vessel below said inlet means, and said tubes in the same bank being radially attached to said outlet means in the same plane as the plane of the tubes being attached to the inlet means thereby operably producing in-plane bank units which can be removed individually from said inlet and said outlet means by detaching the end connection of each of said tubes whereby each bank can be easily assembled and disassembled in individual units without affecting the other bank of tubes.